United States Patent [19]

Yates

[11] 3,728,367

[45] Apr. 17, 1973

[54] SOLUTION CONTAINING A TRIVALENT ANTIMONY-TARTARIC ACID COMPOUND

[75] Inventor: Paul C. Yates, Wilmington, Del.

[73] Assignee: E. I. du Pont de Nemours and Company, Wilmington, Del.

[22] Filed: Nov. 30, 1970

[21] Appl. No.: 93,864

[52] U.S. Cl................................260/446, 260/45.75 R
[51] Int. Cl..................................................C07f 9/90
[58] Field of Search......................................260/446

[56] References Cited

UNITED STATES PATENTS

| | | | |
|---|---|---|---|
| 2,839,554 | 6/1958 | Haslam | 260/446 |
| 3,035,076 | 5/1962 | Gailliot et al. | 260/446 |
| 3,080,406 | 3/1963 | Marks et al. | 260/446 |
| 3,245,958 | 4/1966 | Hindersinn et al. | 260/446 |
| 3,306,921 | 2/1967 | Axon et al. | 260/446 |

Primary Examiner—Werten F. W. Bellamy
Attorney—Don M. Kerr

[57] ABSTRACT

Solutions of monomeric trivalent antimony-tartaric acid compounds having a molar ratio of antimony to tartaric acid of 1 to 1 to 2 to 1 stabilized with an anion such as chloride in certain polar organic solvents are useful for incorporating flame-retarding antimony compounds into polymeric articles.

13 Claims, No Drawings

SOLUTION CONTAINING A TRIVALENT ANTIMONY-TARTARIC ACID COMPOUND

BACKGROUND OF THE INVENTION

Trivalent antimony compounds with tartaric acid are well known in the art; for example, tartar-emetic (the potassium salt of antimonyl tartaric acid) is well known in medicine. W. G. Christiansen, the author of "Organic Derivatives of Antimony," published by the Chemical Catalog Co., Inc., New York, N.Y. (1925), describes many antimony complexes which are used for medical purposes. Tartrate complexes of antimony have also been used in analytical chemistry to prevent precipitation of antimony. However, such complexes usually contain an excess of the complexing acid relative to antimony.

Most of the published literature on antimony-tartaric acid compounds and complexes relates to aqueous systems. Tartar-emetic is dimeric and insoluble in polar organic solvents such as DMF.

British Patent No. 779,288 claims flameproofing compositions for polymers such as polyesters, polystyrenes, etc., consisting of potassium antimonyl tartrate (tartar-emetic), or related antimonyl tartrate salts such as ammonium, barium, etc., and a chlorinated paraffin wax. The flameproofing composition is dry mixed with the polymer resin by conventional means such as a rubber mill, and subsequently cured at elevated temperature, obtaining a "panel" which is "self-extinguishing in a few seconds" in a burning test, and which is "translucent." The patent does not disclose making fibers or films by spinning or casting from a solvent.

Compounds such as potassium antimonyl tartrate, a constituent in the flameproofing composition disclosed in British Patent No. 779,288, are insoluble in polar organic solvents such as dimethylformamide (DMF), which is a preferred spinning solvent for polyacrylonitrile fibers.

There is a need for a flameproofing composition which can be mixed with organic polymers dissolved in polar organic solvents, prior to spinning fibers or casting films, which will impart permanent flame-resistance and not adversely affect the appearance or physical properties of the material. These requirements are met by the novel, stable, monomeric trivalent antimony-tartaric acid complexes of this invention which are soluble in polar organic solvents useful in spinning fibers and casting films of organic polymers.

SUMMARY OF THE INVENTION

Monomeric trivalent antimony-tartaric acid compounds shown below

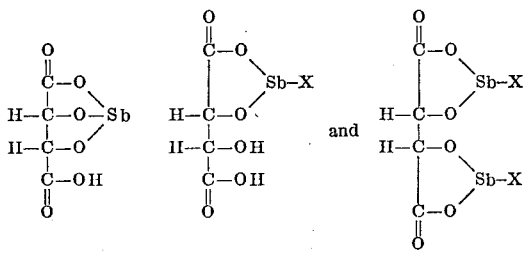

where X is an anion such as chloride, bromide, nitrate or ethoxide may be stabilized with one of the same anions to form a corresponding complex

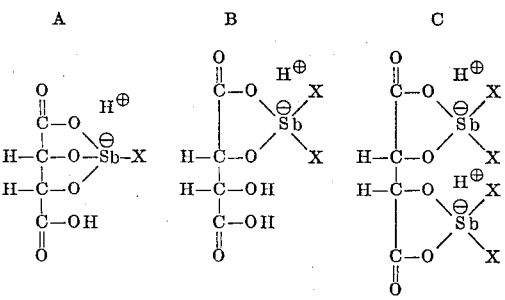

These complexes are readily soluble in many polar organic solvents such as formic acid, formamide, methylformamide, dimethylformamide, acetamide, ethylene glycol, glycerol, diethylene glycol, propanediols and dimethylsulfoxide. The solutions are compatible with many polymers such as polyacrylonitrile, copolymers of acrylonitrile with vinyl chloride and vinylidene chloride, nylon and polyesters, which are soluble in the same polar organic solvents. The stable mixture of polymer and compound can be spun into fibers or cast into films by conventional procedures, and the resulting products possess a high degree of permanent flame resistance.

DESCRIPTION OF THE PREFERRED EMBODIMENTS

The Complexin Solution

This invention comprises solutions of monomeric antimony tartrate compounds stabilized with certain anions, in polar organic solvents.

The solutions are transparent and colorless, and their stability is such that they do not undergo a change in appearance or physical properties over periods as long as several months at room temperature. They are also sufficiently stable at elevated temperatures, e.g., 100°–140°C., to permit spinning of fibers and casting of polymer films.

The solutions can be prepared by reacting tartaric acid with hydrated antimony oxide in polar organic solvents in the presence of hydrogen chloride, or in anhydrous polar organic solvents by reacting tartaric acid with antimony triethoxide. The mole ratio of antimony to tartaric acid must be 2:1 or less to achieve a stability of at least several weeks, and mole ratios of antimony to tartaric acid in the range of 1.3:1 to 1:1 are necessary in order to achieve stabilities of several months. Although solutions of the antimony-tartaric acid compounds in polar organic solvents containing excess tartaric acid, such that the molar ratios of antimony to tartaric acid of as low as 1:5, have good stability, it is not desirable to prepare molar ratios below 1:1, from the standpoint of their intended use as flame retardant additives. The preferred mole ratios of antimony to tartaric acid range from about 1.3:1 to 1:1, since such compositions combine both practical storage life and sufficient antimony content for effective and economic use of the compounds as flame retardant additives. The concentration of antimony and tartaric acid in polar organic solvents, from which the mole ratio of antimony to tartaric acid is calculated, can be determined by standard analytical procedures. The antimony analysis can be made most conveniently by atomic absorption spectroscopy and tartaric acid can be determined by a non-aqueous titration method, such as described in "The Determination of Alkaline Salts of Organic Acids by Residual Nonaqueous Titration" by Martin J. Blake, J. Am. Pharm. Assn., Scientific Edition, Vol. 46, pp. 163–66.

The upper limit of antimony concentration in the solutions depends on the solubility of the compounds of the invention in the particular polar organic solvent, but generally does not exceed about 30 percent for stable solutions. Preferred solutions of the invention contain about 15 percent by weight antimony, along with tartaric acid in about equimolar proportions. Such solutions are stable at room temperature for over several months, and are compatible with solutions of polymers, such as polyacrylonitrile, in polar organic solvents, such as dimethylformamide. Dilute stable solutions of antimony-tartaric acid compounds in polar organic solvents are easily prepared, but these solutions are of little practical significance at total antimony concentrations below about 2 percent. From the standpoint of their use as flame retardants, solutions having concentrations of at least 5% of the antimony are preferred.

Tartaric Acid

The dextro, levo and racemic forms of tartaric acid are equally effective for preparing the solutions of compounds of types (A) and (C) shown earlier. The meso form may also be used but it reacts more slowly to give compounds of type (B).

Sources of Hydrated Antimony Oxide

The hydrated antimony oxide used to prepare the compounds of the invention should be in the form of a fine suspension, or preferably a colloidal dispersion in the polar organic solvent. A preferred source is a colloidal dispersion of antimony oxide prepared by reacting gaseous ammonia with a solution of antimony trichloride in dimethylformamide (DMF) containing water. The precipitated ammonium chloride is removed by filtration and hydrated antimony oxide is recovered as a colloidal sol in DMF. A portion of the chloride is not removed in the process and is present in the final sol, possibly as antimony oxychloride in solution. A precipitate of hydrated antimony oxide suitable for preparing the compounds of the invention may also be obtained by adding a stoichiometric quantity of water to solutions of antimony triethoxide in polar organic solvents such as dimethylformamide or dimethylsulfoxide (DMSO).

Polar Organic Solvents

The compounds of the invention are soluble in many polar aliphatic organic solvents. Suitable solvents include formic acid, formamide, methylformamide, dimethylformamide, acetamide, ethylene glycol, glycerol, diethylene glycol, propanediols, such as 1,3-propanediol, and dimethylsulfoxide. Solvents such as ethanol, methanol, tetramethylurea, dimethylacetamide, acetic acid, furfural, and are not satisfactory solvents for the compounds of the invention. In general, suitable solvents are characterized by a dieletric constant measured at 25°C. and $10^4$ to $10^5$ cycles per second which exceeds 35 electrostatic units (ESU) and a ratio of carbon atoms in the solvent molecule to hetero atoms such as oxygen, nitrogen, and sulfur which is less than 1.7.

The preferred solvents are those which are also good solvents for organic polymers such as dimethylformamide, and dimethylsulfoxide, which are excellent solvents for polyacrylonitrile and copolymers of polyacrylonitrile with vinyl and vinylidene halides. Also preferred are solvents for polyamide polymers such as 66 nylon, which include formic acid, formamide, and mixtures of formamide with formic acid. Solvents which dissolve polyesters at high temperature are also preferred solvents of the invention, and these include ethylene glycol, glycerol, and diethylene glycol.

Dimethylformamide is most preferred, since this solvent is convenient to prepare dispersions of antimony oxide by reacting ammonia with solutions of antimony trichloride, precipitating and removing ammonium chloride by filtration. Solutions of compounds of the invention may be prepared by dissolving tartaric acid in an antimony oxide dispersion in DMF, and the compounds can be transfrred to other solvents either by the addition of solvents with higher boiling points than DMF, and removing the latter by fractional distillation under reduced pressure, or by recovering the solid compounds by evaporation of the DMF under reduced pressure and redissolving the residue in the desired solvents.

Solutions of compounds stabilized as chlorides may contain up to 5 percent water, but it is preferred that the water content be less than 2 percent, and substantially anhydrous solutions are most preferred, i.e., containing less than 0.01 percent water. Compounds which are stabilized as the ethoxides are susceptible to hydrolysis and solutions of these compounds must be substantially anhydrous to avoid the formation of undesirable precipitates.

Antimony Tartaric Acid Compounds

Thin layer paper chromatography of DMF solutions of the compounds of the invention, using a mixture of 75 percent methanol and 25 percent water as the eluant and a dilute solution of iodine in carbon tetrachloride as the developer, gives characteristic spots, readily distinguishable from those obtained using solutions of tartaric acid and dispersions of antimony oxide. Measurement of the optical rotation on solutions of the compounds gives values considerably greater than the optical rotation measured on salts of tartaric acid and is in the range consistent with the compounds having chelated structures.

The compounds of the invention are distinguishable from tartaric acid and tartar-emetic by the infrared absorption spectra of their solutions in dimethylsulfoxide, as shown below. The compound for which the data is given is stabilized by one equivalent of hydrogen chloride in the dimethylsulfoxide solution.

| | I.R. Absorption Peaks |
|---|---|
| Tartaric acid (in DMSO) | Singlet at 5.77 $\mu$ |
| Tartar-emetic (in KBr) | Singlet at 6.20 $\mu$ |
| Antimony tartaric acid compound (in DMSO) | Doublet at 5.76 $\mu$ and 5.93 $\mu$ |
| Sb/tartaric acid ratio 1:1 | |

The carboxylic group absorption maximum at 5.76–5.77 $\mu$ is present in both tartaric acid and the antimony tartaric acid compound, but not in tartar-emetic. The absorption peaks observed at both 5.77 and 5.93 $\mu$ are characteristic of the compound. The 5.77 $\mu$ absorption clearly shows that one

group is free and that the compound has a monomeric structure rather than dimeric, which has been established by X-ray structural analysis for tartaremetic. The 5.93 μ absorption is characteristic of the antimony tartaric acid compound and is believed to be due to intramolecular salt formation between the antimony and one of the carboxylic acid groups of tartaric acid, as shown below:

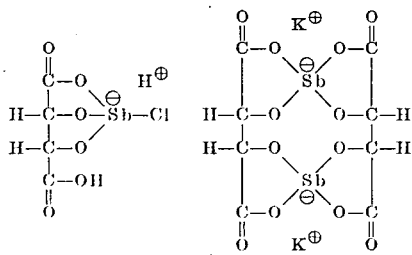

Antimony-tartaric acid complex  Tartar-Emetic

In the absence of the anion of a strong acid the antimony tartaric acid compounds dimerize and precipitate from the solution. The precipitated material has an infrared absorption curve identical with that of tartar-emetic. Although the compounds can be stabilized by the anions of the other strong acids, such as nitrate and bromide, the chloride is highly preferred. The chloride to antimony ratio is in the range of 0.5:1 to 1.9:1 and preferably 0.8:1 to 1.2:1. The maximum stability of solutions of the compounds of the invention is obtained at chloride to antimony ratios of 1:1 and higher ratios than this result in progressive decomposition of the compounds of the invention. At a ratio of 3:1 the solutions contain tartaric acid, and antimony trichloride. The effect of high levels of chloride on the compounds of the invention is apparent from measurements of the optical rotation of dimethylformamide solutions containing increasing amounts of chloride, as shown below.

| HCl added Equiv. Cl/Equiv. Sb | Optical Rotation | |
| --- | --- | --- |
| 0.5 | + 3.8 | This indicates salt formation with no apparent decomposition |
| 1 | + 3.8 | |
| 2 | + 2.0 | These show decomposition of the complex |
| 3 | + 0.3 | |

In many applications, a high level of chloride is undesirable because of equipment corrosion problems, or adverse effects on the organic polymer with which the compounds of the invention are incorporated. In such cases the alkoxide stabilized compositions of the invention discussed below are the preferred embodiment.

The mole range of antimony to tartaric acid is in the range of 1:1 to 2:1. Excess antimony oxide above that required to give the 1:1 compounds (A) and (B) shown earlier, results in the formation of the 2:1 compound (C). The 2:1 compound hydrolyzes readily in water to give finely divided antimony oxide and the 1:1 compound as indicated by paper chromatography. The 1:1 compounds may also form salts with metal cations but these are usually less soluble in polar organic solvents than the compounds themselves.

The compounds of the invention may also be stabilized as the ethoxides of the antimony tartaric acid compound, as shown below, the ratio of ethoxide to antimony being in the range of 1:1 to 2:1.

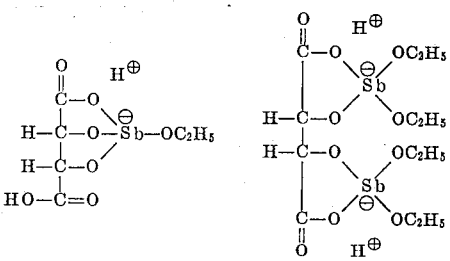

However, the ethoxides are readily hydrolyzed in the presence of water, resulting in the formation of dimer which is insoluble, and stable solutions in the polar organic solvents previously described are obtaind only if the solvents are essentially anhydrous, that is, contain less than 0.1 percent by weight of water. The ethoxides are also not as stable as the chlorides when heated and decomposition results in the precipitation of dimer. In view of the greater stability and lower susceptibility to hydrolysis, the chloride stabilized compounds are preferred to the ethoxide stabilized compounds except when Cl⁻ free compounds must be used for other reasons such as equipment corrosion problems.

Processes of the Invention

Solutions containing compounds of the invention stabilized as chlorides may be prepared as follows: Antimony trichloride is dissolved in DMF containing 1.5 moles of water per mole of antimony. Ammonia gas is bubbled into the solution, maintained at a temperature between 15°–50°C., with vigorous agitation, until about 2 moles of chloride are precipitated in the form of ammonium chloride, which is removed by filtration. The filtrate is recovered as a clear and colorless dispersion of hydrated antimony oxide or oxychloride in DMF.

Tartaric acid is then dissolved at room temperature in the antiomony oxide dispersion in DMF, to obtain a solution of compounds of antimony and tartaric acid stabilized as chlorides.

In the preparation of the antimony oxide dispersion, a portion of the chloride is not removed, and at least 0.5 moles of chloride per mole of antimony is present in the resulting dispersion.

It is important not to remove all the chloride from the DMF solution of metal chlorides. Upon further addition of ammonia to a dispersion in which only about 1 mole of chloride per mole of antimony is present, the solution becomes viscous, and below a ratio of 0.5:1 gelation usually occurs.

Since both the dissolution of the antimony trichloride in DMF and the formation of ammonium chloride are exothermic processes, external cooling must be provided. At temperatures higher than about 50°C., satisfactory dispersions are not obtained, because excessive growth of the antimony oxide particles results in instability or the formation of gels, which are unsuitable for the preparation of solutions of the compounds of the invention.

The reaction times depend upon the type of agitation, the degree of dispersion of ammonia gas, and the cooling efficiency. High local concentrations of ammonia due to inadequate agitation or dispersion can cause gelling. Inadequate cooling results in a high reaction temperature, which results in loss of ammonia and solvent and precipitation of the metal oxides. High reaction temperatures can also produce very dark colored dispersions, resulting in colored solutions which are undesirable for many applications.

An alternative source of hydrated antimony oxide for the preparation of the compounds of the invention is a dispersion prepared by slowly adding 3 moles of water per mole of antimony to a solution of antimony triethoxide in DMF or DMSO with vigorous agitation. Tartaric and hydrochloric acid are then added to the dispersion in the proportions required to give the desired ratios of antimony to tartaric acid and chloride, with stirring at about room temperature, and clear colorless solutions of the compounds of the invention are obtained. Hydrochloric acid may be used to hydrolyze the antimony triethoxide and the resulting dispersions may then contain sufficient chloride to stabilize the antimony-tartaric acid compounds which are formed when tartaric acid is dissolved in the dispersions.

Tartaric acid may be dissolved in anhydrous solutions of antimony triethoxide in DMF or DMSO to give clear colorless solutions of the antimony tartaric acid compounds stabilized as the ethoxides. The addition of water to such solutions results in hydrolysis of the ethoxides and the formation of undesirable precipitates.

Replacing DMF with Other Polar Solvents

Solutions of the compounds of the invention can be prepared in solvents other than DMF and DMSO by adding a higher boiling polar solvent, such as glycerol, to the DMF or DMSO solutions and removing the original solvent by fractional distillation at reduced pressure. Thus DMF is distilled off at about 40°C. under a partial pressure of 0.1 mm. Hg to give a solution of the antimony-tartaric acid compounds in glycerol. The solution is transparent and colorless, and is also stable at room temperature for over a month. It is obvious that this method of preparing solutions of the compounds of the invention in various solvents is applicable only to those solvents that have boiling points higher than DMF and DMSO.

Stable solutions of the antimony-tartaric acid compounds in polar organic solvents which are more volatile than DMF and DMSO can be prepared by redispersing in these solvents the solid residue that is obtained by evaporation under reduced pressure of the solvent from solutions in DMF and DMSO.

Utility of the Invention

The compositions of the invention possess a unique combination of properties, particularly for applications as flameproofing additives for organic polymers soluble in the polar organic solvents of the invention such as polyacrylonitrile, copolymers of acrylonitrile with vinyl and vinylidene halides, polyamides, polyesters, polyurethane, polyacrylates, polyvinyl chloride and acrylonitrile-butadiene styrene copolymers. First, and as previously noted, they are soluble in and compatible with a variety of solvents which are commonly used for spinning and film casting of such polymers. This is in contrast to many prior art materials such as the glycol compounds of trivalent antimony, potassium antimonyl tartrate, and similar metal salts of trivalent antimonyl tartrates which are insoluble in the solvents most suited for processing organic polymers.

The compositions of this invention are also compatible with the polymers themselves. This allows the compositions to maintain an essentially molecular state of subdivision and dispersion as the solvent is eliminated from the polymer. Thus, the compositions of this invention do not deluster films and fibers of polymers into which they are incorporated, nor do they interfere seriously with the mechanical properties of such polymers, as is the case with compositions of the prior art not showing such compatibility with organic polymers.

Because of the fine state of subdivision maintained as a result of this compatibility, the compositions of this invention are highly active on a unit weight basis and thus excel over prior art sources of antimony as flameproofing materials. For example, it has often been customary in the art to incorporate large particle size antimony oxide, antimony sulfide, and similar insoluble compounds into organic polymers. The large particle size of such prior art materials not only causes delustering and pluggage of spinnerettes and filter packs, but also leads to relatively low efficiency in flame retardation, since generally only the surface atoms in a large particle can participate in the chemical reactions which enhance flame resistance.

Finally, the compositions of this invention possess a very useful balance between excessive water sensitivity and permanence. Many antimony compositions are easily hydrolyzed in water. Examples includes simple trivalent esters of antimony with lower alcohols such as antimony trimethoxide or ethoxide, as well as antimony halides, such as antimony trichloride. Such compositions are so water sensitive that unless even the most minute traces of moisture are absent, they cannot be processed without hydrolysis, followed by substantial particle growth which, in turn, leads to delustering, difficulties in spinning, and lowered efficiency as flameproofing agent.

Many antimony compounds can be readily dissolved in water and extracted from an organic polymer. Since the organic polymer fiber or film very often must be processed in the presence of large amounts of water, antimony compounds which are soluble in water, often are not suitable as permanent flame retardant treatments. Even in polymer systems which are not subjected to this type of processing, many dyeing operations involve extended immersion in hot aqueous solutions. This is also true of washing and scouring operations which are encountered not only in processing, but in the end use of the fiber or fabric.

The chloride stabilized compositions of this invention have a useful balance of properties with respect to hydrolysis and solubility in water. They are sufficiently resistant to avoid premature hydrolysis due to traces of water during processing. The extent to which the compositions of the invention are susceptible to hydrolysis depends on the ratio of the components and the conditions. However, any antimony containing hydrolysis products formed are in an extremely fine size range, such that these particles do not scatter light, and thus do not lead to delustering of the fiber. Because the particle size of the hydrolysis products is so fine, they also maintain the high efficiency characteristic of a molecular or near molecular state of subdivision.

Since the compounds of the invention can be incorporated into polymers in polar organic solvents without causing a change in properties after solutions of compounds of the invention are mixed with polymer solutions, the polymers can be processed in a conventional manner, to make shaped articles. Thus, the solutions can be used directly for dry spinning of fibers or casting of films in the case of polymers such as polyacrylonitrile which are conventionally processed in this manner. Alternatively, the solvent can be removed and the polymers containing compounds of the invention can be melt-extruded to form rods, pellets, fibers, foams or films or molded to form other articles.

For example, the antimony-tartaric acid compounds in DMF can be intimately mixed with a DMF solution of acrylonitrile containing vinylidene or vinyl halides as copolymers. The fibers spun from compositions containing 1 – 20 percent by weight of $Sb_2O_3$ based on the polymer, are lustrous, and show flame resistance; the preferred range is 5 – 10 percent of $Sb_2O_3$ based in the polymer.

Generally, polymers containing organic halogens either as copolymers or as an additive such as polyvinyl chloride, tetrabromophthalic anhydride, chlorinated or brominated waxes and terpenes etc. respond most favorably to the antimony compounds of the invention, presumably because of the formation of volatile antimony halides and oxyhalides which interfere with flame propogation by trapping free radicals. For this reason, smaller amounts of antimony compounds are required when used in conjunction with organic halogens and highly flame-resistant polymers can be prepared having only a few percent of the antimony compounds of the invention.

The following examples further describe this invention. All percentages are on a weight basis unless otherwise noted.

EXAMPLE 1

One mole of $SbCl_3$ (228 gm.) is dissolved in 900 gm. of DMF and 450 gm. of DMF containing 1.5 moles of distilled water (27 g.) is then added, obtaining a transparent solution. The temperature of the solution is maintained below 30°C. during the dissolution of $SbCl_3$ and water in DMF. While the solution is vigorously agitated, anhydrous ammonia is introduced into the solution by bubbling through a 1/16 inch I.D. glass tube at the rate of 0.7 g. per minute. The resulting chemical reaction is monitored by measuring the pH of the solution using a calomel reference electrode and a Model 7 pH meter, as supplied by Corning Glass Co.

Initially the solution has a pH of 1.20 at 15°C. As ammonia is bubbled in, the pH of the solution increases slowly, and upon reaching a pH of 3.3 at 16°C., a white precipitate is formed. The reaction is permitted to proceed further by adding the ammonia continuously, and when a pH of 4.4 at 18°C. is reached, the flow of ammonia is stopped. The temperature of the solution is kept below 20°C. during the entire operation described above. The agitation is then stopped and the solution is suction filtered through a "coarse" grade fritted ceramic filter plate, thereby obtaining a fluid filtrate that is transparent and colorless. The amount of precipitate recovered is 131 gm. The filtrate is again bubbled with ammonia while being agitated to remove additional chloride, and upon reaching a pH of 5.5 at 15°C., the solution is agitated for 5 minutes without the flow of ammonia. The precipitated ammonium chloride is removed by filtering as before, and the filrate is a transarent colorless dispersion of colloidal antimony oxide in DMF. A total of 49 g. of ammonia is added for the entire reaction, and the amounts of filtrate and $NH_4Cl$ precipitate recovered from the second filtration are 147.5 g. and 20 g., respectively. Analysis of the sol gives 7.6 percent antimony by atomic absorption and 1.54 percent chloride ion by potentiometric titration. The sol also contains 2.52 percent water, as determined by Karl-Fisher titration.

The antimony oxide sol prepared above is then mixed within 1 hour after its preparation with tartaric acid in the following manner: To 1000 g. of antimony oxide sol at room temperature is added 82 g. of d-tartaric acid. The solution becomes opaque about 10 minutes after the entire amount of the tartaric acid is dissolved. However, upon further agitation for 16 hours, the solution becomes colorless and transparent. The resulting solution of the compound of antimony oxide-tartaric acid in DMF has a pH of 3.6 at room temperature, and contains 7.10 percent of antimony as determined by atomic absorption. Thus, the molar ratios of antimony to tartaric acid and chloride to antimony of the solution prepared as described above are 1.06:1 and 0.75:1, respectively.

To 200 g. of the solution thus prepared, 100 g. of DMF is added and the diluted solution is distilled with continuous agitation at a temperature of 45°C. and under a partial pressure of about 0.2 mm Hg. Water and DMF are distilled off and when 105 g. of distillate is recovered, the distillation residue is cooled and analyzed. The sol now contains 7.12 percent antimony, 7.60 percent tartaric acid, 1.42 percent chloride and less than 0.5 percent water, corresponding to a molar ratio of 1.16:1 for antimony to tartaric acid, and 0.69:1 for chloride to antimony.

The solution before the removal of water has a molecular optical rotation by polarimetry of +87° as determined after its concentration of antimony is adjusted to 0.0005 moles per ml. of DMF by adding 21.10 g. of DMF to 85 g. of the solution. It has a storage stability of over a month, as the physical properties of the solution are not changed in this period.

The solution is mixed with a dimethylformamide solution of acrylonitrile copolymerized with about 15% vinyl chloride, and the resulting clear solution, which is stable for several days, is used to spin fibers. A fabric woven from the fibers, which contains about 8 percent antimony oxide, is not delustered, and is self-extinguishing in a 45° angle burning test (Test Method AATCC 33 — 1962 as described on pages B-139 to B-142 of the AATCC Technical Manual, 1968 edition, Volume 44, September 1968 published by the American Association of Textile Chemists and Colorists, Research Triangle Park, North Carolina; method modified by maintaining flame impingement until specimen ignites or for a maximum of 30 seconds).

EXAMPLE 2

A dispersion of antimony oxide in DMF is prepared by reacting 1 mole (228 g.) of antimony trichloride ($SbCl_3$) in 700 g. of DMF containing 27 g. of water with ammonia. The pH of the solution is 1.0 at 15°C. While under vigorous agitation, ammonia is bubbled into the solution in the manner described in Example 1, thereby obtaining an initial white precipitate of ammonium chloride at a pH of 1.9. The solution is cooled to maintain the temperature between 15° and 30°C. The ammonia is introduced continuously and upon reaching a pH of 3.3 at 21°C., the flow of ammonia is stopped and the solution is filtered, thereby recovering 882 g. of a clear dispersion of antimony oxide in DMF. A total of 26 g. of ammonia is required to precipitate 77 g. of $NH_4Cl$, and analysis shows that the sol contains 13.80 percent antimony, 6.05 percent chloride, and 2.95 percent water.

To 500 g. of the above dispersion is then added 51.5 g. of d-tartaric acid, obtaining an opaque solution which becomes transparent upon agitation for about 16 hours. The molar ratio of antimony to tartaric acid of the resulting solution is 1.65:1, and the molar ratio of chloride to antimony is 1.5:1.

The solution is stable at room temperature for several weeks after which it becomes slowly turbid, and a precipitate of metal oxide is deposited.

The solution is added to a DMF solution of acrylonitrile copolymerized with about 15 percent vinyl chloride and a film containing about 5 percent antimony is cast from the solution. The clear, lustrous film is self-extinguishing in a 45° angle burning test.

EXAMPLE 3

This example describes the preparation of a stabilized solution of an antimony tartaric acid compound in glycerol.

One-half a mole of antimony trichloride, 114 g., is dissolved in 500 g. of DMF and 13.5 g. of distilled water are added to the solution. After the solution is cooled to 20°C., ammonia is passed into the solution as described in Example 1. The pH of the solution is 1 initially, at 20°C.; however, with the addition of ammonia, pH is increased to 2.6 and the solution becomes turbid due to the precipitation of $NH_4Cl$. When a pH of 2.85 is reached at 22°C., the ammonia flow is stopped, and the solution is filtered as described in Example 1. A total of 43 g. of precipitate is recovered. More ammonia is passed into the clear filtrate and upon reaching a pH of 3.3 at 21°C., the flow of ammonia is discontinued and the solution is filtered, using about 50 g. of DMF to rinse the ammonium chloride filter cake. The transparent filtrate and the precipitate recovered from the second filtration are 585 g. and 21 g., respectively. Analysis shows the antimony oxide sol to contain 9.68 percent antimony, 5.35 percent chloride, and 3.92 percent water, corresponding to 1.9:1 molar ratio of chloride to antimony.

In a 1000 ml. round bottomed flask is placed 200 g. of the sol prepared above, along with 23.85 g. of d-tartaric acid. The mixture is stirred, thereby obtaining a fluid solution in which antimony and tartaric are present in 1:1 molar ratio. To the solution is added 200 g. of glycerine. The mixture is then distilled to remove DMF and water while agitating it under partial pressures of 2.4 – 0.75 mm Hg and at temperatures of 22°–58C. After about 1 hour, the transparent, colorless and slightly viscous distillation residue is cooled and 261 g. is recovered. The solution contains 6.4 percent antimony, 8.68 percent of tartaric acid, 3.57 percent of chloride, and 2.19 percent of water, corresponding to molar ratio of antimony to tartaric acid of 0.92, and chloride to antimony of 1.9:1.

The physical properties of this solution are substantially similar to those of the solution prepared in Example 1, and it is stable at room temperature at least 1 month without changing its physical properties.

EXAMPLE 4

This example describes the preparation of a stabilized solution of an antimony tartaric acid compound in dimethylsulfoxide.

A sample of 100 grams of the DMF solution of the antimony-tartaric acid compound of Example 2 is placed in a 500 ml. flask and the DMF is evaporated under a pressure of 0.01 mm. Hg at room temperature for 210 hours. 27.9 grams of friable, solid residue is obtained after the drying. Analyses show that the residue contains 45.1 percent antimony and 20.3 percent chloride, the balance being tartaric acid. The analyses correspond to an antimony-tartaric acid mole ratio of 1.6:1 and a chloride to antimony mole ratio of 1.56:1. A sample of 10 g. of the solid residue is dissolved in 100 g. of dimethylsulfoxide by agitating the mixture at about 40°C. in a beaker, thereby obtaining a clear solution of antimony-tartaric acid compound in dimethylsulfoxide. The solution contains 4.05 percent antimony and 1.87 percent chloride, corresponding to 1.60 mole of chloride per mole of antimony.

The solution is stable for over a week at room temperature, and the films cast from solutions of polymers, such as acrylonitrile which is copolymerized with vinylidene chloride, mixed with the above solution of antimony-tartaric acid compound are highly flame resistant.

EXAMPLE 5

This example describes the preparation of a chloride stabilized DMF solution of an antimony tartaric acid compound using antimony triethoxide as the source of antimony.

A mixture of 7.7 parts of antimony triethoxide (0.03 moles) and 60 cc. of dimethylformamide is added to a 250 cc. R.B. flask. A solution containing 1.8 parts water (0.1 mole) and 1.1 parts hydrogen chloride (0.03 moles) is added gradually to the dimethylformamide solution with stirring. At this point a white precipitate of antimonous acid (or partially hydrolyzed derivative) is formed. To the stirred mixture is then added 4.5 parts d-tartaric acid (0.03 moles). Reaction is immediate and a clear solution is formed in minutes. The solution has a molar optical rotation $[M]_D^{25} = +76°$. The mole ratio of antimony to tartaric acid and chloride to antimony are both about 1:1.

The solution is used to make a flame retardant vinyl chloride modified polyacrylonitrile fiber as described in Example 1.

EXAMPLE 6

Example 5 is repeated using 60 cc. of dimethylsulfoxide in place of the dimethylformamide. A clear, stable solution is obtained with a molar optical rotation $[M]_D^{25} = +162°$. Infrared analysis of the mixture shows two carbonyl stretching bands at 5.76 and 5.92 $\mu$ of equal intensity. The mole ratios of antimony to tartaric acid and chloride to antimony are both about 1:1.

EXAMPLE 7

This example describes the preparation of a DMF solution of an antimony tartaric acid compound stabilized as the ethoxide.

A mixture of 7.7 parts of antimony triethoxide (0.03 moles) and 60 cc. of dimethylformamide or DMSO is added to a 250 cc. R.B. flask. To this mixture is then added 4.5 parts d-tartaric acid (0.03 moles). A precipitate forms immediatly which rapidly redissolves in the DMF. Only a trace of solid material remains undissolved which can be removed by filtration. Infra-red analysis of the mixture shows two carbonyl stretching bands at 5.77 and 5.98 $\mu$. The latter is stronger in intensity.

The mole ratios of antimony to tartaric acid and chloride to antimony are both about 1:1.

The solution is used to make a clear, lustrous, self-extinguishing film of acrylonitrile copolymerized with about 15 percent vinyl chloride, as described in Example 2.

I claim:

1. A solution comprising at least one monomeric trivalent antimony-tartaric acid compound selected from the group consisting of

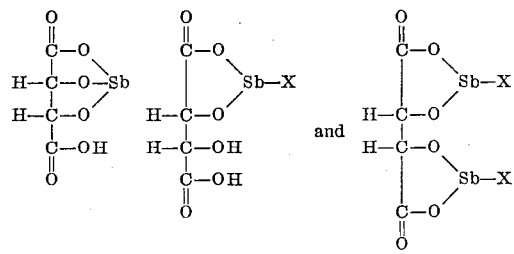

where X is a member selected from the group consisting of chloride, bromide, nitrate and ethoxide, said compound being stabilized with an anion selected from the group consisting of chloride, bromide, nitrate and ethoxide and a polar organic solvent having a dielectric constant of greater than 35 electrostatic units measured at 25°C. and at $10^4$ to $10^5$ cycles per second and a ratio of carbon atoms to hetero atoms selected from the group consisting of nitrogen, oxygen, and sulfur less than 1.7.

2. The solution of claim 1 wherein said polar organic solvent is selected from the group consisting of dimethyl formamide, dimethyl sulfoxide, formamide, monomethyl formamide, acetamide, formic acid, ethylene glycol, diethylene glycol, glycerol and propanediol.

3. The solution of claim 2 wherein the polar organic solvent is dimethylformamide.

4. The solution of claim 2 wherein the anion is chloride and said chloride is present in a molar ratio to antimony of from 0.5 to 1 to 1.9 to 1.

5. The solution of claim 4 wherein the molar ratio of chloride to antimony is from 0.8 to 1 to 1.2 to 1.

6. The solution of claim 5 having a molar ratio of antimony to tartaric acid of from 1 to 1 to 1.3 to 1.

7. The solution of claim 4 wherein said polar organic solvent is dimethylformamide.

8. The solution of claim 2 wherein the polar organic solvent is dimethylsulfoxide.

9. The solution of claim 4 wherein the polar organic solvent is dimethylsulfoxide.

10. The solution of claim 2 wherein the anion is ethoxide and said ethoxide is present in a molar ratio of antimony of from 1 to 1 to 2 to 1.

11. The solution of claim 10 wherein the molar ratio of antimony to tartaric acid is from 1 to 1 to 1.3 to 1.

12. The solution of claim 10 wherein said polar organic solvent is selected from the group consisting of dimethylformamide and dimethylsulfoxide.

13. A process for producing stable solutions of monomeric trivalent antimony-tartaric acid compounds stabilized by an anion selected from the group consisting of chloride and bromide in dimethylformamide comprising a. dissolving an antimony compound selected from the group consisting of antimony trichloride and antimony tribromide and 1.5 moles of water per mole of antimony compound in dimethylformamide to form an antimony solution, b. bubbling sufficient ammonia into the antimony solution while maintaining the temperature of the antimony solution between 15°C. and 50°C. to precipitate between 1.1 and 2.5 moles of ammonium salt forming a reaction mixture, c. filtering the ammonium salt from the reaction mixture, and d. dissolving tartaric acid in the filtered reaction mixture.

* * * * *